(12) United States Patent
Zhao et al.

(10) Patent No.: US 11,984,919 B2
(45) Date of Patent: May 14, 2024

(54) PIM CANCELLATION ARCHITECTURE

(71) Applicant: XILINX, INC., San Jose, CA (US)

(72) Inventors: Hongzhi Zhao, Los Gatos, CA (US);
Christophe Erdmann, Cannes (FR);
Hemang M. Parekh, San Jose, CA (US); Xing Zhao, San Ramon, CA (US); Xiaohan Chen, Sunnyvale, CA (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 17/959,079

(22) Filed: Oct. 3, 2022

(65) Prior Publication Data

US 2024/0113738 A1    Apr. 4, 2024

(51) Int. Cl.
*H04B 1/12*      (2006.01)
*H04L 27/01*      (2006.01)

(52) U.S. Cl.
CPC .............. *H04B 1/123* (2013.01); *H04L 27/01* (2013.01)

(58) Field of Classification Search
CPC ................................. H04B 1/123; H04L 27/01
See application file for complete search history.

(56) References Cited

U.S. PATENT DOCUMENTS

| | | | |
|---|---|---|---|
| 2019/0363750 A1* | 11/2019 | Lai .................... | H04B 1/109 |
| 2023/0142639 A1* | 5/2023 | Kularatna ............ | H04B 1/123 |
| | | | 455/67.13 |
| 2023/0179252 A1* | 6/2023 | Ellgardt ................ | H04B 1/525 |
| | | | 375/267 |
| 2023/0179455 A1* | 6/2023 | Chen ................... | H04L 27/0008 |
| | | | 375/285 |
| 2023/0318648 A1* | 10/2023 | Mahmood ............ | H04B 1/0475 |
| | | | 455/78 |

* cited by examiner

*Primary Examiner* — Dac V Ha
(74) *Attorney, Agent, or Firm* — Patterson + Sheridan LLP (57) ABSTRACT

Embodiments herein describe a PIM correction circuit. In a base station, TX and RX RF changes, band pass filters, duplexers, and diplexers can have severe memory effects due to their sharp transition bandwidth from pass band to stop band. PIM interference, generated by the TX signals and reflected onto the RX RF chain will include these memory effects. These memory effects make PIM cancellation complex, requiring complicated computations and circuits. However, the embodiments herein use a PIM correction circuit that separates the memory effects of the TX and RX paths from the memory effects of PIM, thereby reducing PIM cancellation complexity and hardware implementation cost.

20 Claims, 12 Drawing Sheets

PIM CANCELLATION ARCHITECTURE

TECHNICAL FIELD

Examples of the present disclosure generally relate to passive intermodulation (PIM) cancellation.

BACKGROUND

PIM is a growing issue for cellular network operators. PIM issues may occur as existing equipment ages, when co-locating new carriers, or when installing new equipment. PIM is a particular issue when overlaying (duplexing) new carriers into old antenna runs.

PIM can create interference that reduces a cell's receive sensitivity or even block calls. This interference can affect both the cell that creates it, as well as other nearby receivers. In cell communication systems, PIM can create interference and reduce receiver sensitivity. For example, in LTE, if two transmitter carriers transmitting from a base station system experience PIM interference, their intermodulation can lead to a component that falls into the receive band. This will affect the receiver as well potentially other systems.

As the spectrum has become more crowded and antenna sharing schemes become more common, there is a corresponding increase in the possibility of PIM interference from the intermodulation of different carriers. The traditional way of using frequency planning to avoid PIM becomes almost impossible.

SUMMARY

One embodiment describes an integrated circuit that includes an equalizer configured to equalize receive (RX) data received from a RX channel, a transmit (TX) modeling circuit configured to receive TX data and model effects from transmitting the TX data in a TX channel where the RX channel and the TX channel are coupled to a duplexer, a passive intermodulation (PIM) compensation circuit configured to receive an output of the TX modeling circuit and generate a PIM compensation value, and a mitigation circuit configured to mitigate or remove PIM interference from the equalized RX data using the PIM compensation value.

Another embodiment describes a circuit that includes an equalizer configured to equalize receive (RX) data received from a RX channel, a transmit (TX) modeling circuit configured to receive TX data before the TX data propagates in a TX channel comprising analog circuitry and model effects from transmitting the TX data in the TX channel, a passive intermodulation (PIM) compensation circuit configured to receive an output of the TX modeling circuit and generate a PIM compensation value, and a mitigation circuit configured to mitigate or remove PIM interference from the equalized RX data using the PIM compensation value.

Another embodiment describes a method that includes equalizing receive (RX) data received from a RX channel, generating modeled TX data by modeling effects from transmitting TX data in a TX channel where the RX channel and the TX channel are coupled to a duplexer, generating a PIM compensation value based on the modeled TX data and PIM model, and mitigating PIM interference from the equalized RX data using the PIM compensation value.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

DETAILED DESCRIPTION

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the features or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Embodiments herein describe a PIM correction circuit. In a base station, transmit (TX) and receive (RX) radio frequency (RF) changes, RF band pass filters, duplexers, and diplexers can have severe memory effects due to their sharp transition bandwidth from pass band to stop band. PIM interference, generated by the TX signals and reflected onto the RX RF chain will include these memory effects. These memory effects make PIM cancellation complex, requiring complicated computations and circuits. However, the embodiments herein use a PIM correction circuit that separates the memory effects of the TX and RX paths from the memory effects of PIM, thereby reducing PIM cancellation complexity and hardware implementation cost.

In one embodiment, the PIM correction circuit includes an equalizer that removes the memory effects caused by the RX channel or path. Thus, the equalized RX data only includes the effects of the PIM as well as the memory effects of the TX data. The cancellation circuit can include a TX channel model which receives the TX data and models the memory effects of the TX channel or path on the TX data. The modeled TX data can then be input to a PIM compensation circuit to then model the PIM. This modeled PIM should be very close to the PIM that is actually generated by the TX path. The modeled PIM is then subtracted from the equalized RX data, thereby removing or mitigating the PIM. The RX data can then be processed using downstream digital signal processing circuits.

Figure 1:
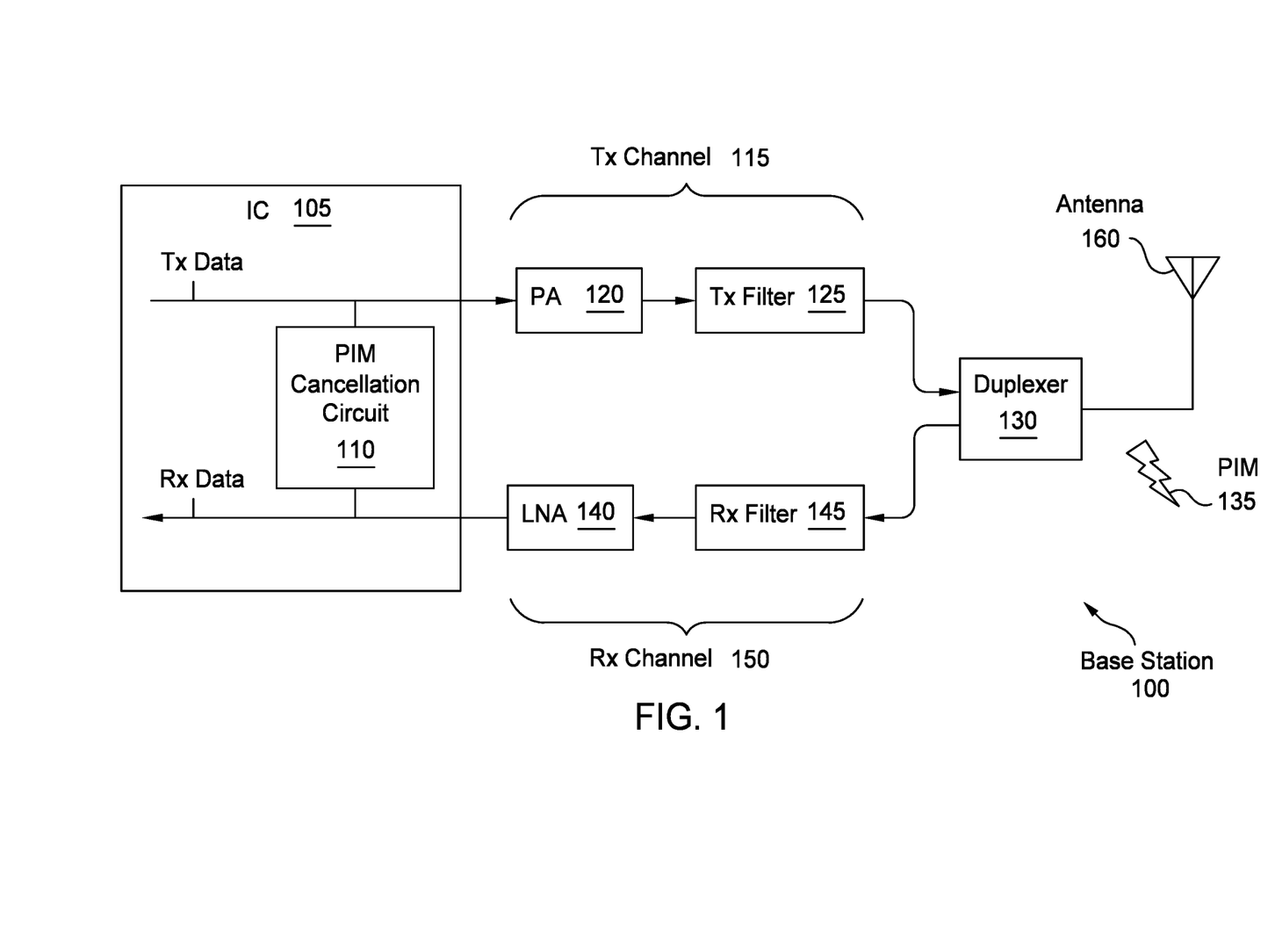
FIG. 1 is a block diagram of a base station that experiences PIM, according to an example.

FIG. 1 is a block diagram of a base station 100 that experiences PIM interference 135, according to an example.

The base station 100 includes an IC 105 that includes PIM cancellation circuit 110 coupled between TX data and RX data paths. The TX data output by the IC 105 is processing by analog circuitry in a TX channel 115. In this example, the TX channel 115 includes a power amplifier (PA) 120 and a TX filter 125 (e.g., a BPF). In one embodiment, the base station 100 may use frequency division duplex (FDD) to transmit and receive data with wireless devices (not shown). Although not shown, the IC 105 can include a baseband processor and digital to analog converters (DACs) to generate the different frequencies.

The base station 100 also includes a duplexer 130 that merges the TX channel 115 (which includes the TX data) with a RX channel 150. Thus, the base station 100 can use an antenna 160 to both transmit and receive signals. When receiving signals, the duplexer 130 ensures the RX signals are forwarded to an RX filter 145. That is, the duplexer 130 removes the RX signals from the shared TX/RX path after being received at the antenna 160, and forwards the RX signals to the RX filter 145.

Because the RX signals typically have much small amplitudes than the TX signals, a low-noise amplifier (LNA) 140 boosts the RX signals before they are transmitted to the baseband processor in the IC 105 for processing.

As shown, the TX signals create PIM interference 135 that has a negative impact of the RX band. For example, the PIM interference 135 in the TX signals from the TX channel can be reflected by an RF load (e.g., the antenna 160) due to imperfect impedance matching. This reflected PIM can then pass through the duplexer 130 and into the RX channel 150 which can make detecting actual RX data hard, if not impossible. Further, the TX filter 125, RX filter 145, the duplexer 130, and a diplexer (not used in this base station 100 implementation) can have severe memory effects due to their sharp transition bandwidth from pass band to stop band. PIM interference, generated by the TX signals and reflected onto the RX RF chain will include these memory effects.

The PIM cancellation circuit 110 can mitigate or remove the PIM interference 135 from the RX signals which includes the memory effects caused by the various analog circuitry in the TX and RX channels 115, 150. The details of the PIM cancellation circuit 110 are described in FIGS. 3-7.

In one embodiment, to save space and hardware costs, the base station 100 can be a carrier aggregation system where multiple carrier transmitters share the same TX channel. In that case, multiple transmitters and PAs generate signals at different frequencies—e.g., 1940 MHz and 1980 MHz for LTE—which are then combined into the same TX channel by a combiner. Further, PIM interference 135 can occur when combining any number of TX signals (e.g., three, four, ten, etc.) which can then negatively impact an RX signal that shares the same channel or path as the TX signals.

Figure 2:
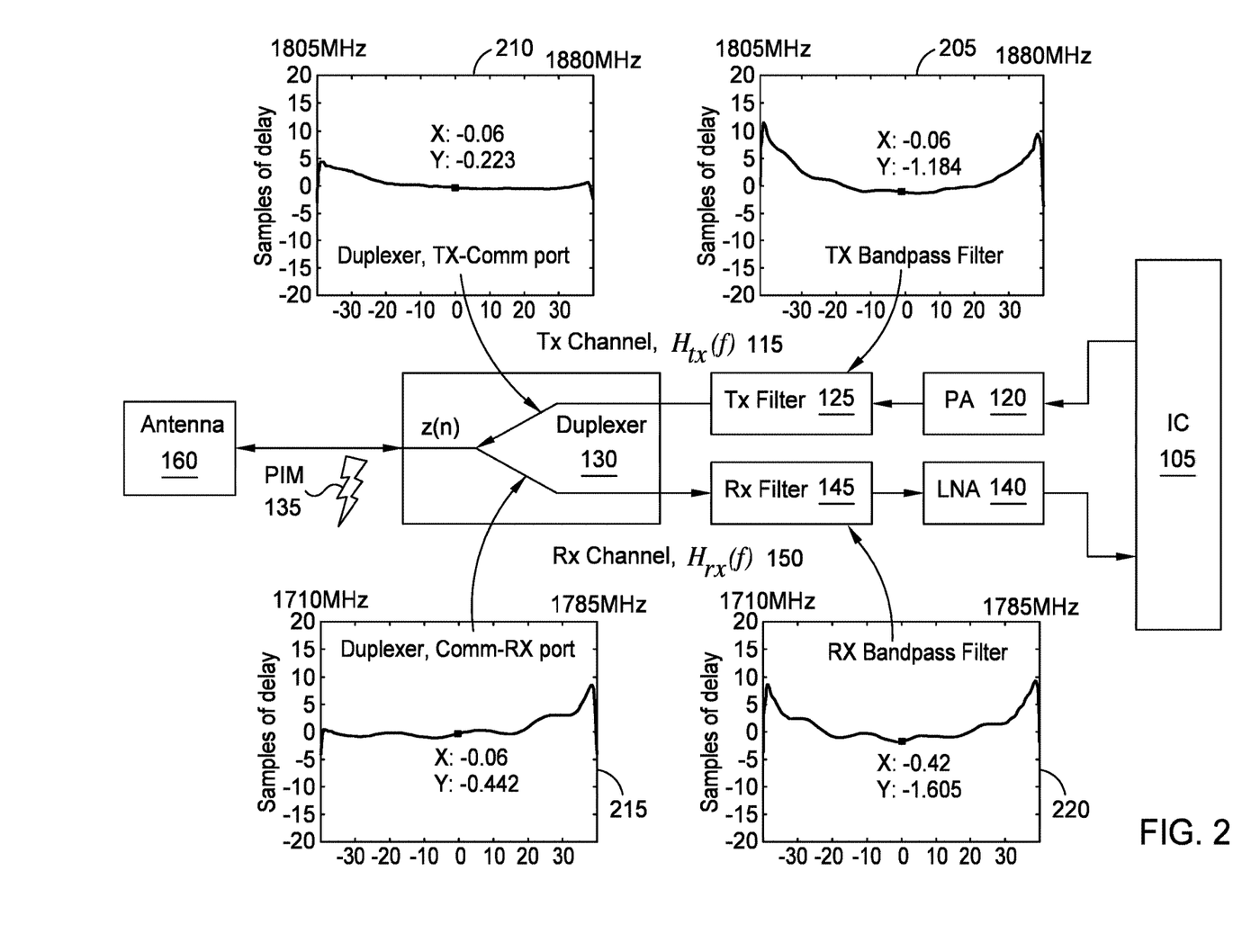
FIG. 2 illustrates factors that affect PIM, according to an example.

FIG. 2 illustrates factors that affect PIM, according to an example. FIG. 2 illustrates a portion of the base station 100 in FIG. 1. Specifically, FIG. 2 illustrates the IC 105, the TX channel 115, the RX channel 150, the duplexer 130, and the antenna 160.

Chart 205 illustrates the group delay (the Y axis) according to frequency (X axis) for the TX filter 125. This group delay is at least particularly due to sharp gain changes in the TX filter 125 within a very narrow transition bandwidth. This results in memory effects in the PIM interference 135 generated by the multi-carrier or multi-band TX signals and are observed at a receiver in the IC 105.

Chart 210 illustrates the group delay (the Y axis) according to frequency (X axis) for the duplexer 130 when transmitting the TX signals from the TX channel 115. These memory effects also affect the PIM interference 135.

Chart 215 illustrates the group delay (the Y axis) according to frequency (X axis) for the duplexer 130 when receiving the RX signals from the antenna 160. These memory effects also affect the PIM interference 135.

Chart 220 illustrates the group delay (the Y axis) according to frequency (X axis) for the RX filter 145. These memory effects also affect the PIM interference 135.

FIG. 2 illustrates that the PIM interference may not be memoryless. That is, the memory effects from the TX filter 125, duplexer 130, and the RX filter 145 (as well as potentially other components such as a diplexer) can impact the PIM interference, thereby making a PIM cancellation algorithm complex and costly to implement since it should consider these memory effects when mitigating or removing the PIM from the RX signals.

Figure 3:
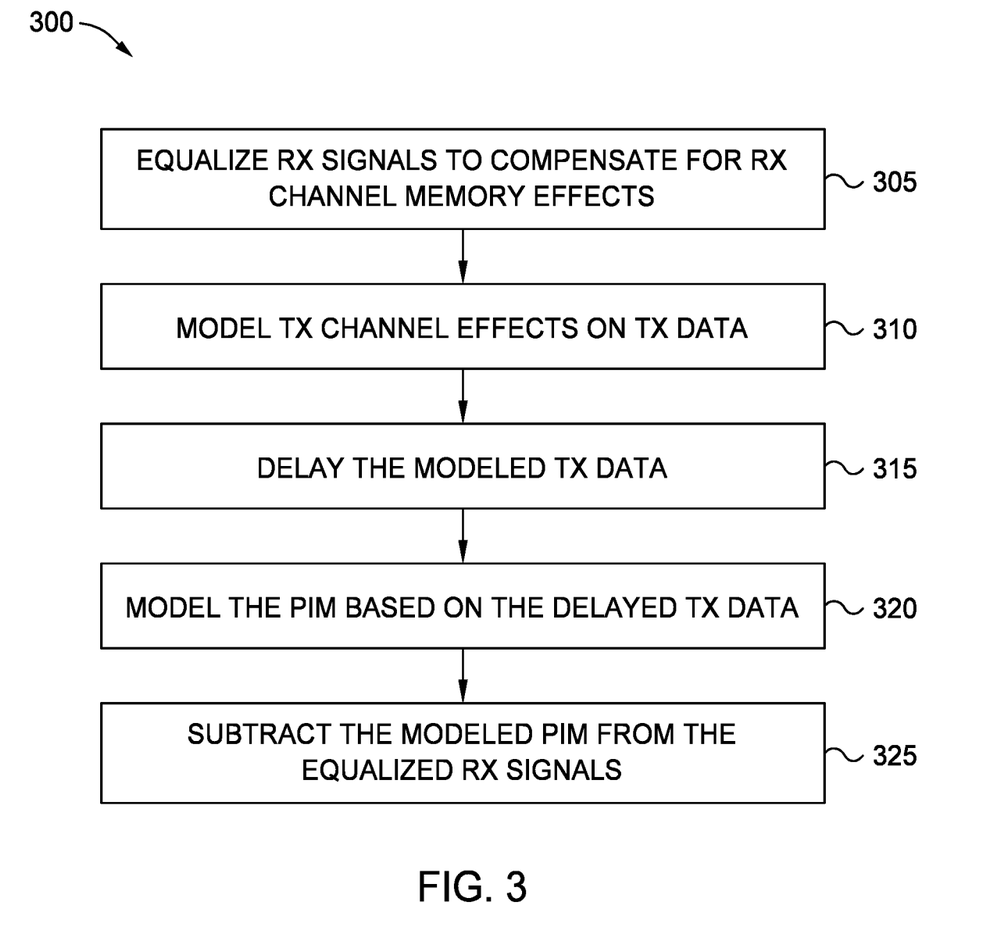
FIG. 3 is a flowchart for performing PIM cancellation, according to an example.

FIG. 3 is a flowchart of a method 300 for performing PIM cancellation, according to an example. For clarity, the blocks in the method 300 in FIG. 3 are discussed in tandem with FIG. 4 which illustrates a PIM cancellation circuit 400 (e.g., one implementation of the PIM cancellation circuit 110 in FIG. 1).

Figure 4:
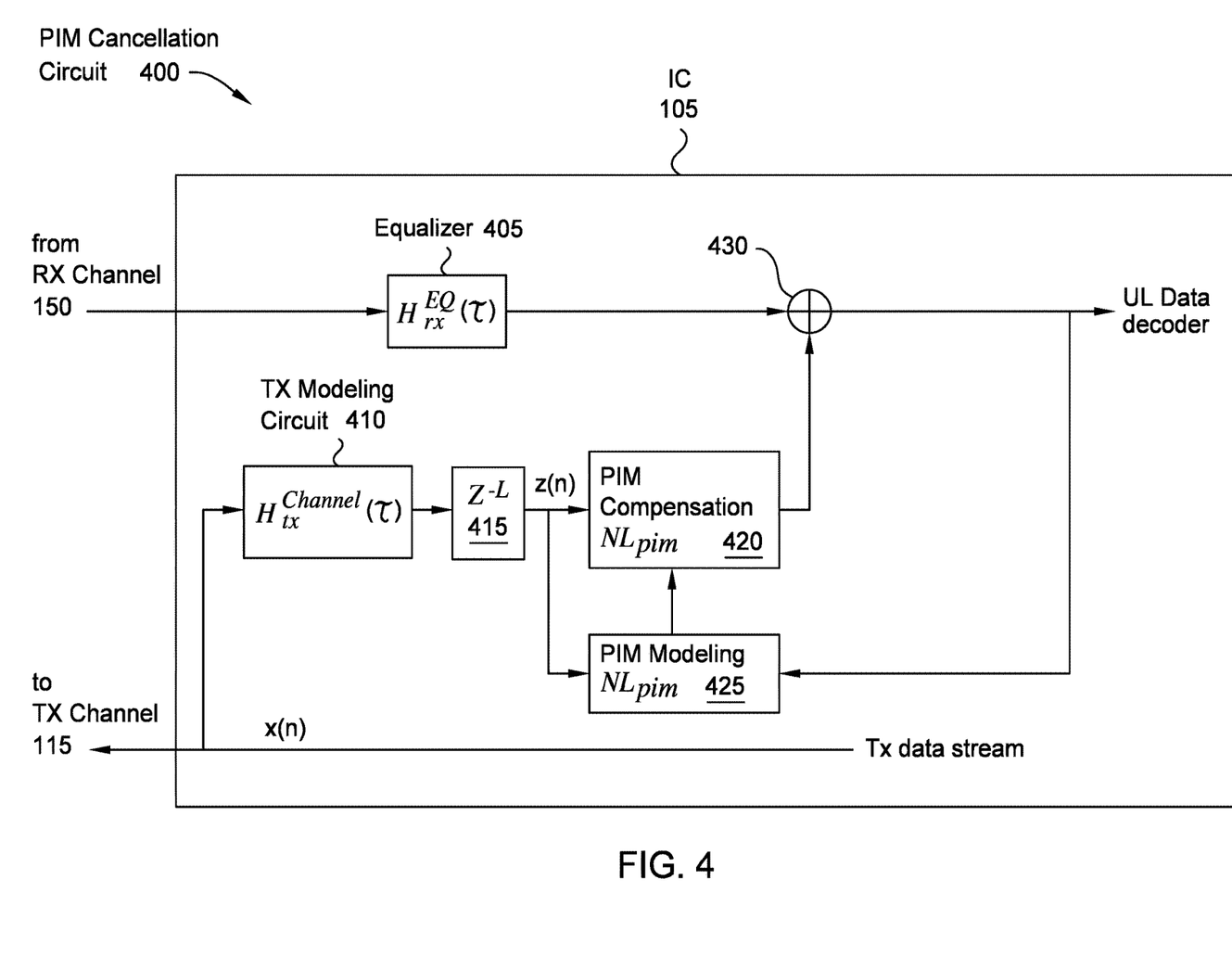
FIGS. 4-6 illustrate PIM cancellation circuits, according to an example.

At block 305, the PIM cancellation circuit 400 equalizes RX data to compensate for RX channel memory effects. The PIM cancellation circuit 400 includes an equalizer 405 which receives RX signals from the RX channel 150. As mentioned above, these RX signals can include PIM interference. Moreover, this PIM interference can be affected by the memory effects by the components in the TX and the RX channels. The equalizer 405 mitigates or removes the memory effects caused by the RX channel 150 from the received RX signals. That is, after passing through the equalizer 405, the RX signals still have the PIM interference which includes the memory effects of the TX channel 115, but the memory effects from the RX channel 150 have been mitigated or removed.

In one embodiment, the equalizer 405 is a digital equalizer that functions as a variable filter. The equalizer 405 can add the inverse effect of the PIM on the RX channel 150. That is, the equalizer 405 can make the group delay for the RX channel flat, so it is no longer frequency dependent.

The taps of the equalizer 405 can be set or trained using a variety of different techniques. In one example, the base station can measure the channel effect in the RX channel 150 (e.g., the RX path from the duplexer 130 in FIG. 1 until the RX signals are received at the IC 105). In one embodiment, the base station may transmit calibration data along this path and measure the received RX signal to determine the characteristics (e.g., the group delay) of the RX channel 150. These characteristics can then be used to configure the taps of the equalizer 405.

The base station may recalibrate the equalizer 405 at intervals (e.g., every few minutes) or after environmental conditions change (e.g., the temperature changes by several degrees). In this example, the PIM cancellation circuit 400 can dynamically update the equalizer 405 as the RX channel characteristics change. One example of training the equalizer 405 is described in FIG. 9A below.

At block 310, the PIM cancellation circuit 400 models TX channel effects on TX data. As shown in FIG. 4, in addition to transmitting the TX data to the TX channel 115, the TX data is also received at a TX modeling circuit 410 which models the effects of the TX channel 115 on the TX data. Stated differently, the output of the TX modeling circuit 410 is the same as the output of the TX channel 115 when the TX data is received at the duplexer 130 in FIG. 1. Thus, the TX modeling circuit 410 mirrors or mimics the effects of the TX channel 115 on the TX data stream.

In one embodiment, to configure the TX modeling circuit 410, the base station transmits calibration data from the along the TX channel 115. The base station can include a coupler at the duplexer that measures the calibration data after it passes through the TX channel 115. The coupler can then transmit the received calibration data back to the IC 105 where it is measured to determine the characteristics of the TX channel. These characteristics are then used to program or configure the TX modeling circuit 410 so it mimics the behavior of the TX channel 115. That is, the TX modeling circuit 410 can take the input (x(n)) of the TX channel 115 and generate an output (z(n)) that matches the output of the TX channel 115. One example of modeling the TX channel 115 is described in FIG. 9B below.

Like the equalizer 405, the TX modeling circuit 410 may also be recalibrated at intervals, or when environmental conditions change.

At block 315, the PIM cancellation circuit 400 delays the modeled TX data. As shown in FIG. 4, the PIM cancellation circuit 400 includes a delay circuit 415 that delays the output of the TX modeling circuit 410 (i.e., the modeled TX data). In one embodiment, the delay introduced by the delay circuit 415 compensates for (or matches) the delay introduced on the TX data stream by the TX channel 115 and the RX channel 150. That is, the delay circuit 415 introduces a delay so its output matches when corresponding PIM interference is received from the RX channel 150. That way, the modeled TX data can be delayed so it matches when the PIM interference associated with that data is received via the RX channel 150 at the IC 105.

At block 320, the PIM cancellation circuit 400 models the PIM based on the delayed TX data. In this example, the PIM cancellation circuit 400 includes a PIM compensation circuit 420 and a PIM modeling circuit 425. The PIM compensation circuit 420 generates a PIM compensation value using a PIM model that negates or cancels PIM interference so that the PIM interference is removed from the RX channel. That is, the PIM compensation circuit 420 outputs a PIM compensation value which, ideally, is a signal that, when subtracted from the RX band via a subtraction circuit 430, cancels out or removes the PIM interference from the signal output by the equalizer 405.

While the PIM compensation circuit 420 can use a static PIM model to generate the PIM compensation value, the PIM interference can change according to the environmental conditions at the base station. Further, when the PIM interference has a magnitude that is equal to or less than the RX data, the RX data can act like a noise signal that prevents the PIM compensation circuit 420 from accurately calculating the PIM compensation value. Thus, instead of having a static PIM model that uses fixed coefficients to generate the PIM compensation value, FIG. 4 illustrates an adaptive PIM compensation scheme where a PIM modeling circuit 425 generates adaptive coefficients to update the PIM model used by the PIM compensation circuit 420 as the PIM interference changes due to changing environmental conditions at the base station. While the embodiments below discuss updating the coefficients for the PIM compensation circuit 420, the adaptive PIM scheme can be used to update any value that adapts the PIM compensation circuit 420 to compensate for changing PIM interference.

In one embodiment, the PIM modeling circuit 425 identifies two different time periods $T_1$ and $T_2$ where the RX data has the same value (or opposite values). The advantage of determining updated coefficients at two time periods when the RX data is the same is that the RX data can be cancelled from the calculation, thereby resulting in updated coefficients that are independent of the RX data. Stated differently, because the RX data can be thought of noise when measuring the PIM interference, removing the RX data permits the base station to more accurately measure the PIM interference, and as a result, generate updated coefficients that result in a PIM compensation value that more accurately matches or models the PIM interference.

Figure 8:
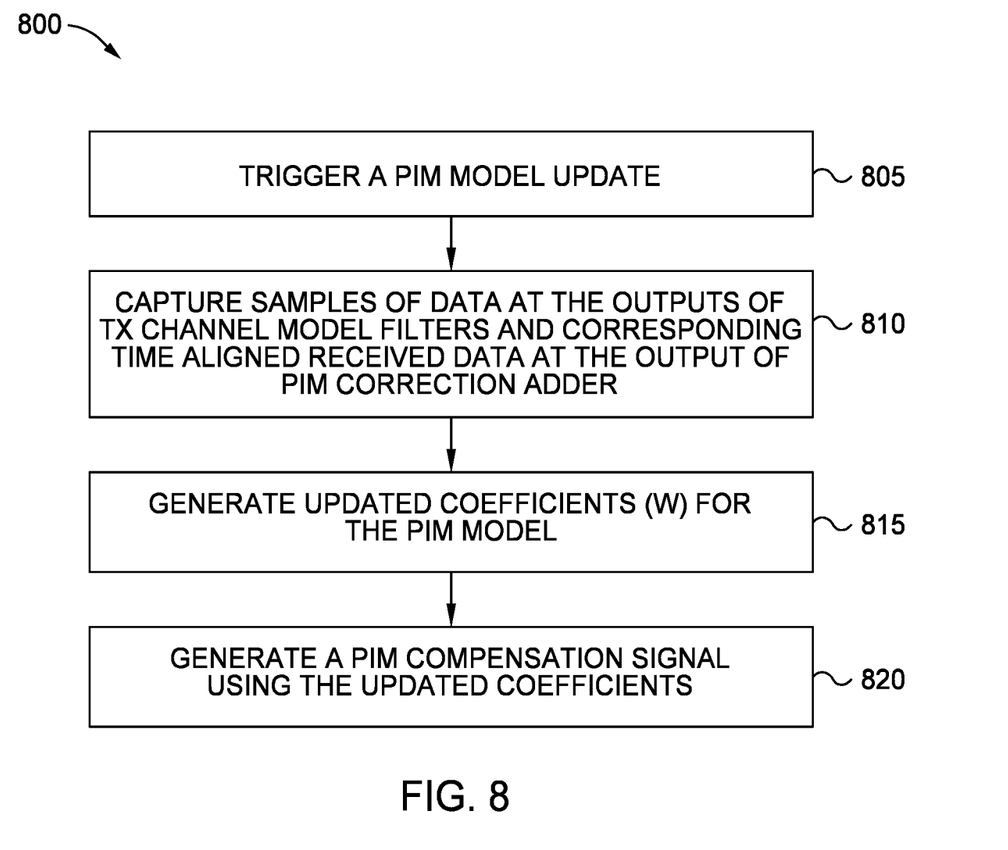
FIG. 8 is a flowchart of a method for performing PIM model adaptation, according to an example.

In one embodiment, the PIM modeling circuit 425 includes circuitry that identifies two time periods $T_1$ and $T_2$ where the RX data is the same. The PIM modeling circuit 425 includes circuitry for sampling the signal at those time periods to generate the updated coefficients. Because the RX data is essentially removed from the calculation performed by the PIM modeling circuit 425, the PIM compensation circuit 420 can generate a PIM compensation value that more accurately matches or models the PIM interference in the signals received from the RX channel 150, regardless whether the amplitude of the PIM interference is greater than, or less than, the magnitude of the RX data. FIG. 8 will discuss the details of performing a PIM model adaptation in more detail.

At block 325, the PIM cancellation circuit 400 subtracts the modeled PIM signals from the equalized RX signals. FIG. 4 illustrates that the output of the PIM compensation circuit 420 (i.e., the PIM compensation value) is subtracted from the output of the equalizer 405 using the subtraction circuit 430. Doing so removes the PIM interference from the received RX signals. However, the subtraction circuit 430 is just one example of a suitable mitigation circuit that can be used to remove the PIM interference from the RX signals using the PIM compensation value.

Advantages of the method 300 include separately compensating for the memory effects of the TX channel 115 and the RX channel 150 using the TX modeling circuit 410 and the equalizer 405, respectively. This simplifies the complexity of calculating the PIM compensation value. In this example, the PIM modeling circuit 425 can provide the coefficients to the PIM compensation circuit 420 which outputs the PIM compensation value, without these circuits having to consider the memory effects of the TX and RX channels 115, 150.

The output of the subtraction circuit 430 outputs signals to a uplink (UL) data decoder (not shown) for further processing.

Figure 5:
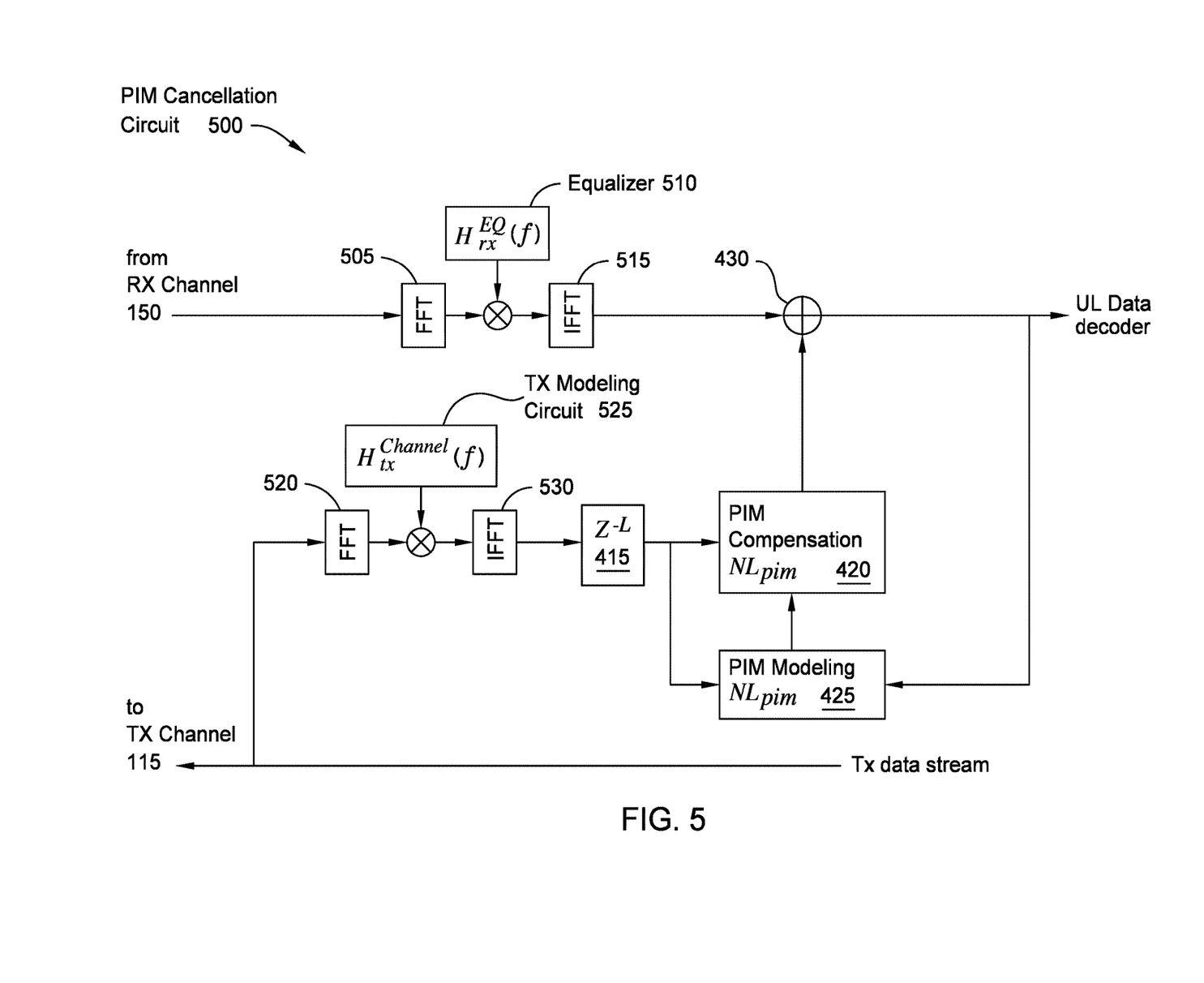

FIG. 5 illustrates a PIM cancellation circuit 500, according to an example. The PIM cancellation circuit 500 includes some of the same circuitry as discussed in FIG. 4, as indicated by the use of the same reference numbers, which is not discussed in detail here.

The PIM cancellation circuit 500 illustrates performing equalization on the RX data and modeling of the TX data in the frequency domain, rather than the time domain as shown in FIG. 4. In this example, a Fast Fourier Transform (FFT) is performed on the RX signals received from the RX channel 150 using an FFT circuit 505. An equalizer 510 then equalizers the transformed signals in the frequency domain. The resulting signals are then processed by an inverse FFT (IFFT) circuit 515 and transmitted to the subtraction circuit 430.

For the TX portion of the cancellation circuit 500, the TX data stream is received at a FFT circuit 520 which performs an FFT operation on the TX data. A TX modeling circuit 525 models the TX data in the frequency domain, rather than the time domain as shown in FIG. 4. An IFFT circuit 530 then converts the results back into the time domain and provides the modeled TX data to the delay circuit 415.

In one embodiment, an overlap-saved FFT structure is used to perform equalization on the RX data and model of the TX data in the frequency domain. In any case, performing this functions in the frequency domain can avoid complicated convolution calculations that result from performing these functions in the time domain.

Figure 6:
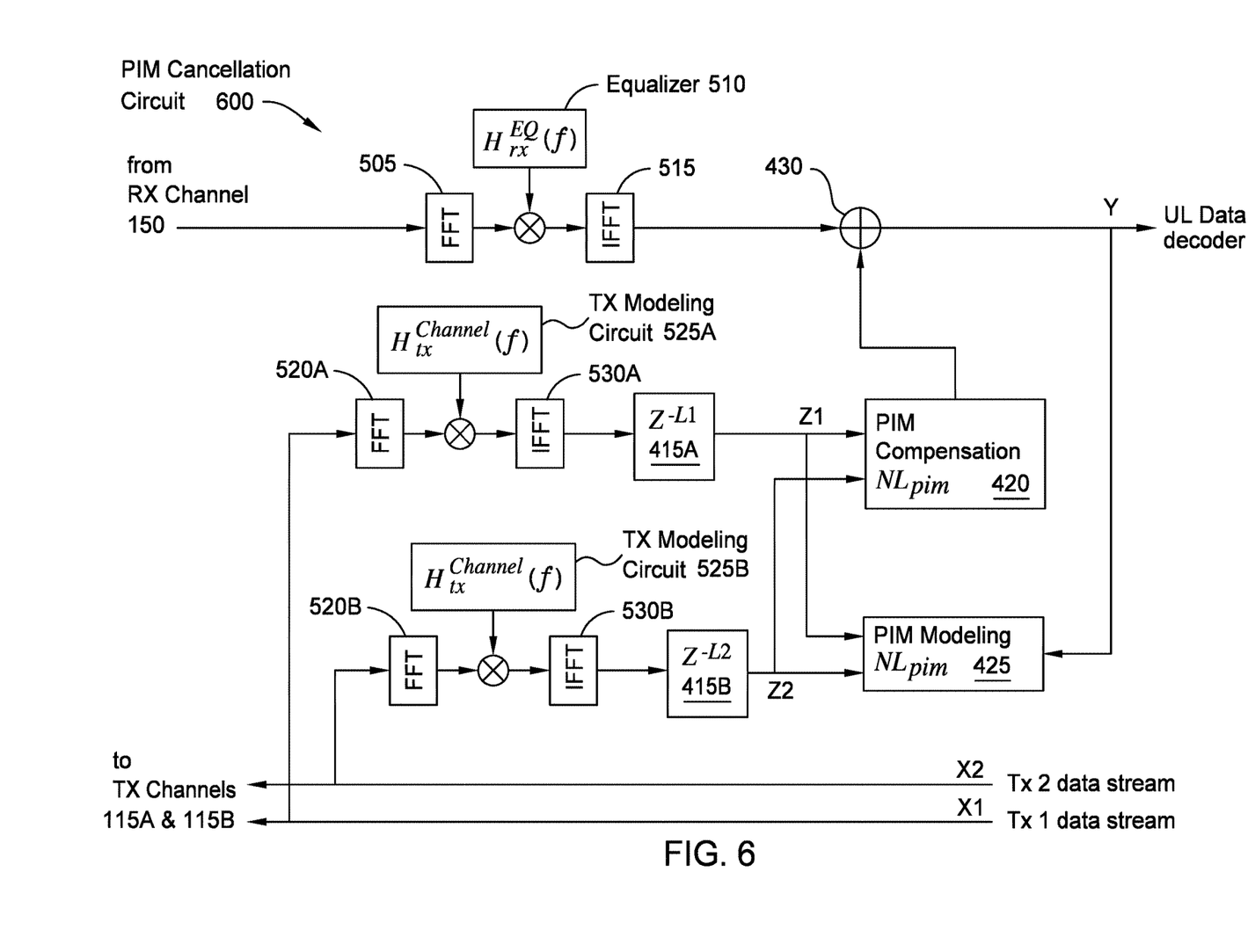

FIG. 6 illustrates a PIM cancellation circuit 600, according to an example. The PIM cancellation circuit 600 includes some of the same circuitry as discussed in FIGS. 4 and 5, as indicated by the use of the same reference numbers. This circuitry is not discussed in detail here.

The PIM cancellation circuit 600 differs from the PIM cancellation circuit 500 in FIG. 5 by including multiple copies of the FFT circuit 520, the TX modeling circuit 525, and the IFFT circuit 530. In this example, the base station includes two TX channels 115A and 115B which share the same antenna as the RX channel 150. To save space and hardware costs, the base station can be a carrier aggregation system where multiple carrier transmitters share the same antenna. In this case, the transmitters and PAs generate signals at different frequencies—e.g., 1940 MHz and 1980 MHz for LTE—using the two TX channels 115A and 115B which are then combined into the same channel by a combiner. The combined TX signals can then be input into a duplexer (e.g., the duplexer 130 in FIG. 1). Thus, instead of having one TX channel, the base station can have multiple TX channels that transmit independent TX data as shown in FIG. 6.

The PIM cancellation circuit 600 includes a FFT circuit 520A for receiving the TX data for a first TX channel 115A and a FFT circuit 520B for receiving the TX data for a second TX channel 115B. The TX data for the TX channels 115A and 115B can be independently modeled by the TX modeling circuits 525A and 525B. The IFFT circuits 530A and 530B convert the resulting signals back into the time domain and input the signals in the PIM compensation circuit 420 and the PIM modeling circuit 425. Thus, FIG. 6 illustrates that the PIM cancellation techniques discussed herein can be used regardless of the number of TX channels (three, four, etc.) being combined.

Figure 7A:
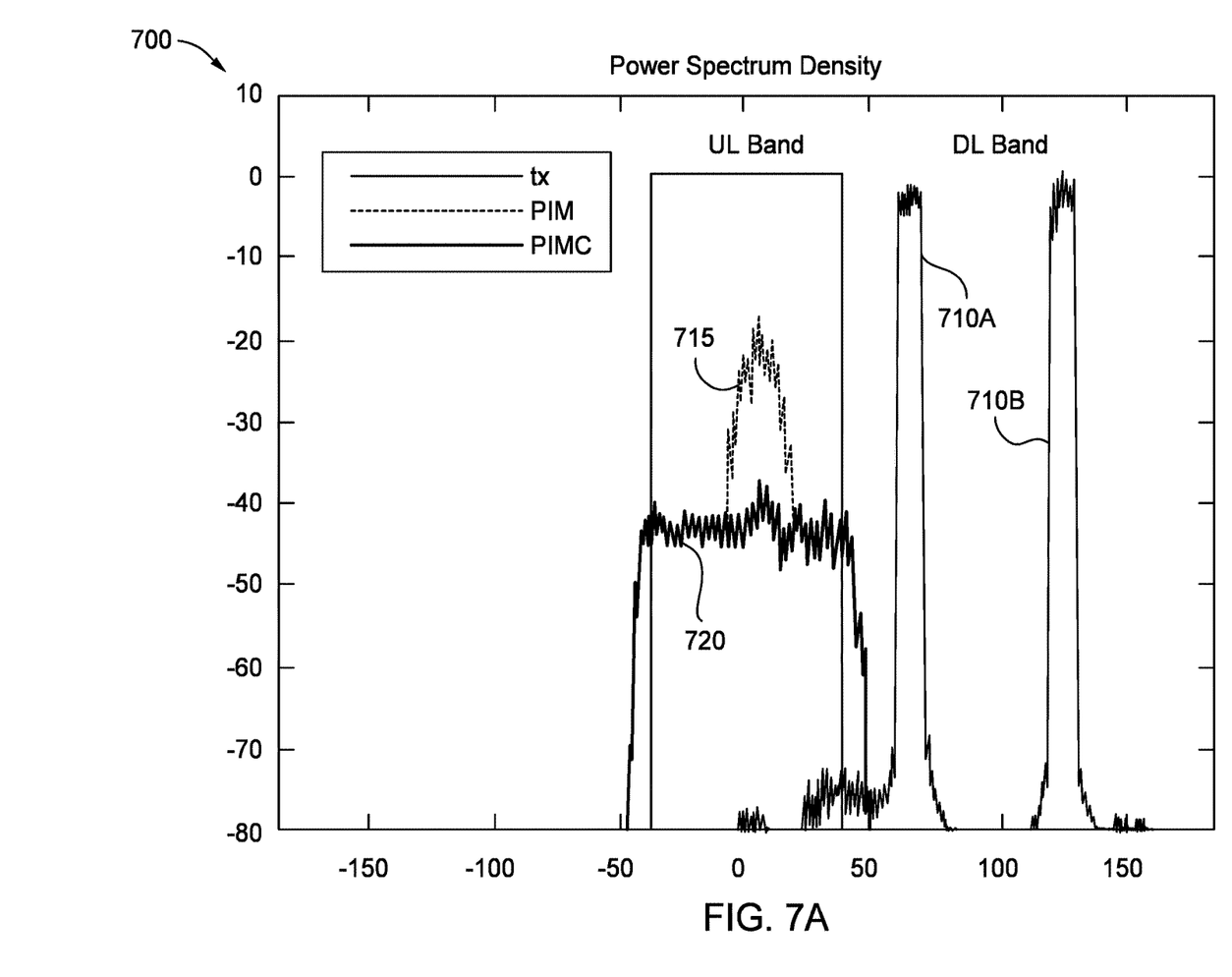
FIGS. 7A-7C illustrate PIM cancellation in different transmit bands, according to an example.
Figure 7B:
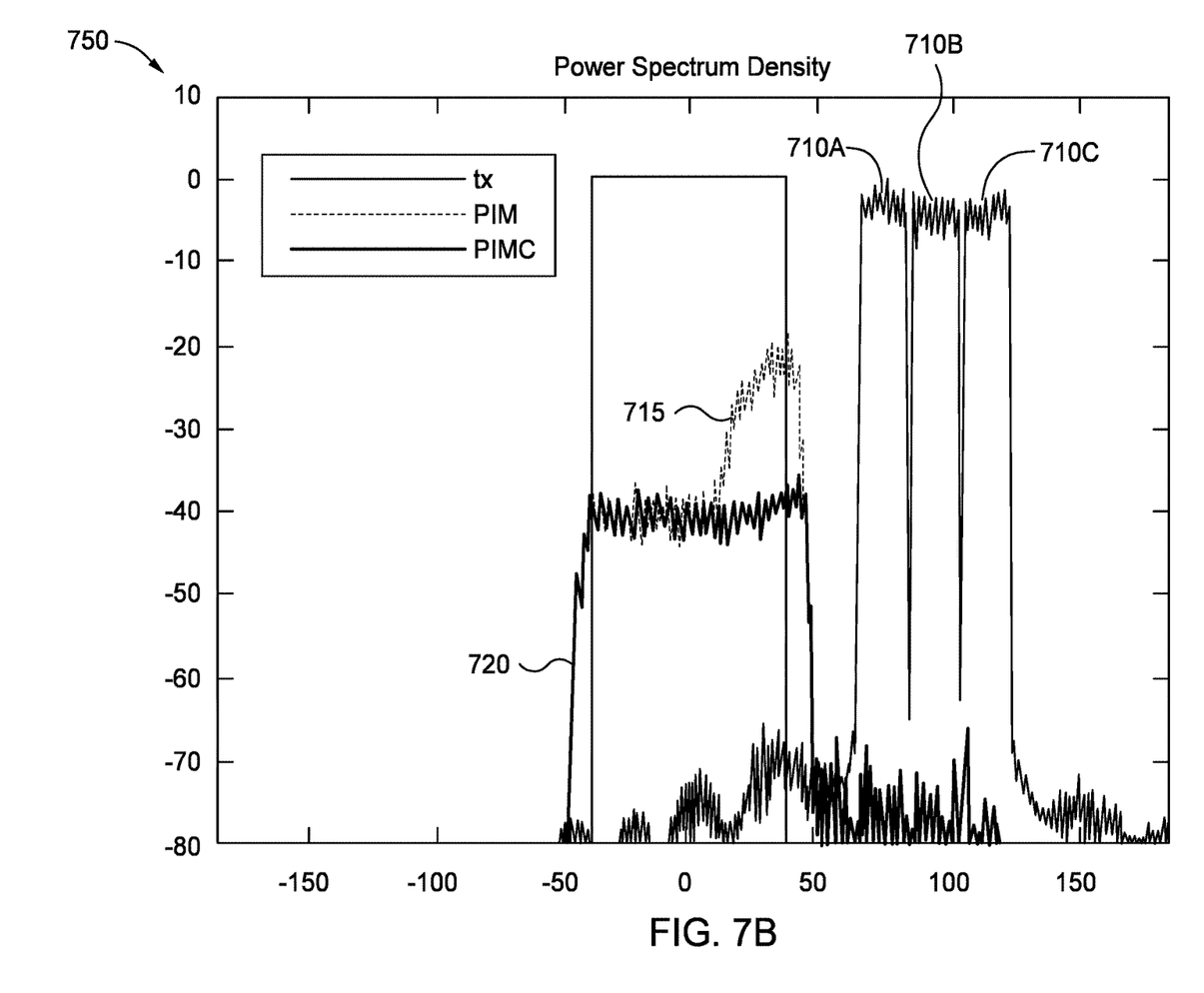
Figure 7C:
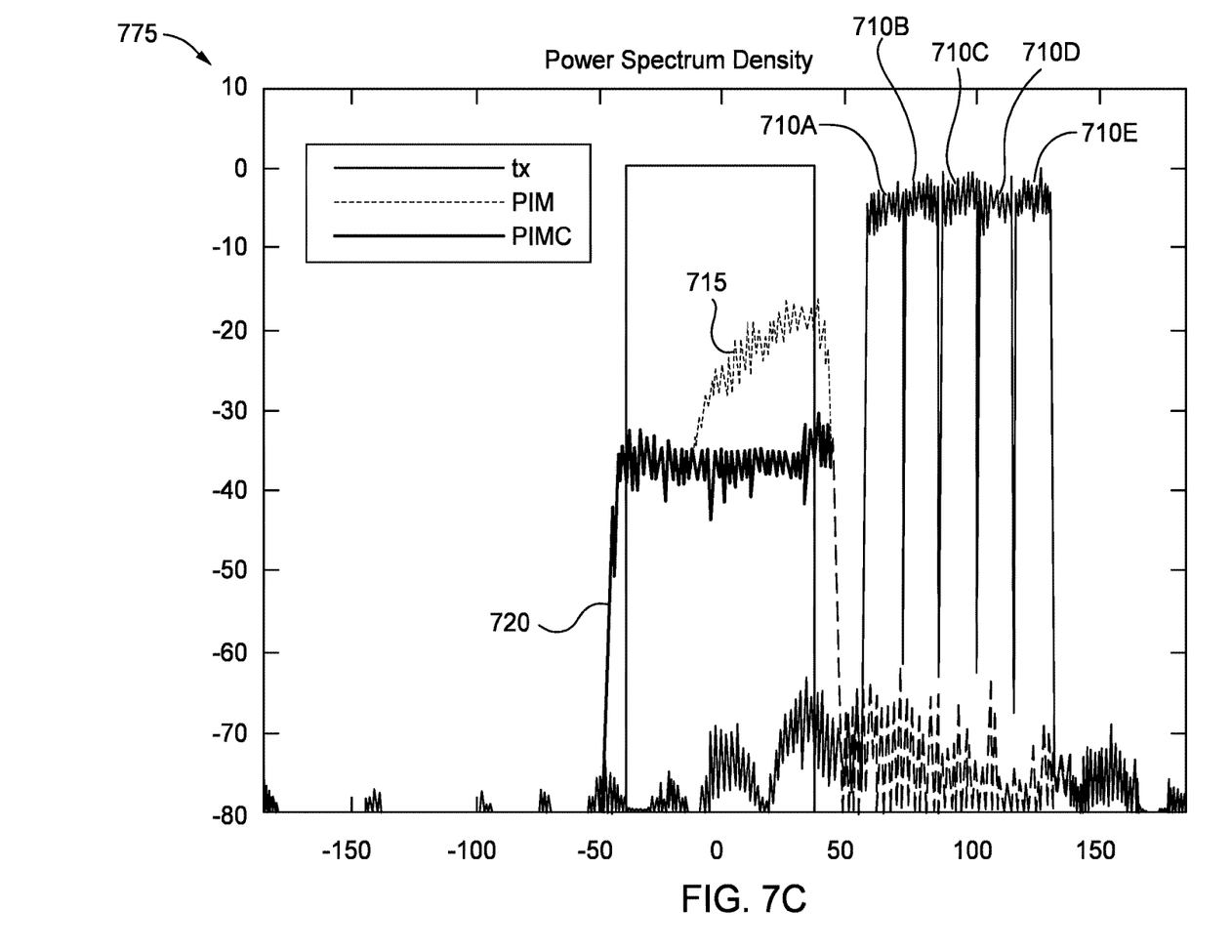

FIGS. 7A-7C illustrate PIM cancellation in different transmit bands, according to an example. Chart 700 in FIG. 7A illustrates PIM cancellation when using two TX carriers 710A and 710B. Chart 750 in FIG. 7B illustrates PIM cancellation when using three TX carriers 710A-C. Chart 775 in FIG. 7C illustrates PIM cancellation when using five TX carriers 710A-E.

The plots 715 in each of the charts 700, 750, and 775 illustrate the noise in the RX signals without PIM correction, while the plots 720 illustrate the noise in the RX signal when using the PIM cancellation described herein. Plots 715 illustrate that if the RX data is below this noise floor, then the RX data cannot be distinguished from the PIM-induced noise floor. However, the plots 720 illustrate that the noise floor has been reduced (by removing the PIM interference) relative to the plots 715, thereby improving the ability of the base station to identify and decode the RX data.

FIG. 8 is a flowchart of a method 800 for performing PIM model adaptation, according to an example. At block 805, the base station triggers a PIM model update. In one embodiment, a PIM model update is triggered according to a predefined schedule or time interval. For example, the base station may update the PIM model every five minutes. In another embodiment, the update may be based on historical changes in environment conditions. For example, the base station may update the model in the early morning (when temperatures are generally the coolest), at noon when temperatures have risen, and at dusk when temperatures generally decrease.

In another embodiment, the base station triggers a PIM model update as it monitors current weather conditions. For example, the base station may update the PIM model whenever the temperature at the base station changes more than two degrees.

At block 810, the PIM modeling circuit (e.g., the PIM modeling circuit 425 in FIG. 4) captures samples of data at the outputs of the Tx channel model filters (e.g., the filters 125 in FIG. 1) and corresponding time aligned received data at the output of the PIM correction adder (e.g., the subtraction circuit 430 in FIG. 6).

Referring to FIG. 6, x1 and x2 is FIG. 6 are the Tx 1 and Tx 2 data. Further, in one embodiment, z1 is the Tx 1 channel model FIR filter output of x1 data. Moreover, z2 is the Tx2 channel model FIR filter output of x2 data. The label y in FIG. 6 is the received data after PIM correction where $$y(n) = \Delta y_{pim}(n) + y_{noise}(n) \quad (1)$$

The PIM model adaption equation is:

$$\Sigma_{k=1}^{K} \Delta w_k f_k(\vec{z}_1, \vec{z}_2) = \Delta y_{pim}(n) + y_{noise}(n) \quad (2)$$

where $y_{noise}(n)$ includes both thermal noise and uplink received data. $f_k$ is the PIM model nonlinear functions. $\Delta y_{pim}$ is the residual PIM component in the received signal after PIM correction. $\Delta w_k$ are the coefficients to be adapted. Z1 and Z2 can be expressed as:

$$\vec{z}_1 = [z_1(n), z_1(n-1), z_1(n-2), \ldots, z_1(n-M+1),]^T \quad (3)$$

$$\vec{z}_2 = [z_2(n), z_2(n-1), z_2(n-2), \ldots, z_2(n-M+1),]^T \quad (4)$$

where M is the PIM model memory.

These equations can be written in the form of:

$$U_{pim} * \Delta W = \Delta y_{pim} + y_{noise} \quad (5)$$

$$U_{pim} = [F_1, F_2, \ldots, F_K], \Delta W = [\Delta w_1, \Delta w_2, \ldots, \Delta w_K]^K \quad (6)$$

$$\Delta Y_{pim} = [\Delta y_{pim}(1), \Delta y_{pim}(2), \Delta y_{pim}(3), \ldots, \Delta y_{pim}(N),]^T \quad (7)$$

$$Y_{noise} = [y_{noise}(1), y_{noise}(2), y_{noise}(3), \ldots, y_{noise}(N),]^T \quad (8)$$

Where N is the number of samples of captured data used for the adaption.

$$F_1 = [f_1(1), f_1(2), f_1(3), \ldots, f_1(N),]^T \quad (9)$$

$$F_2 = [f_2(1), f_2(2), f_2(3), \ldots, f_2(N),]^T \quad (10)$$

$$F_K = [f_K(1), f_K(2), f_K(3), \ldots, f_K(N),]^T \quad (11)$$

The adapted coefficients (W), for example to use a least square error (LS) algorithm, is:

$$\Delta W = (U_{pim}^H U_{pim})^{-1} (U_{pim}^H (\Delta Y_{pim} + Y_{noise})) \quad (12)$$

The new coefficients used in the PIM compensation circuit 420 in FIG. 6 are $$W_{next} = W_{current} + \Delta W \quad (13)$$

The output of the PIM compensation circuit 420 can be expressed as:

$$\hat{y}_{pim}(n) = \Sigma_{k=1}^{K} w_k f_k(\vec{z}_1, \vec{z}_2) \quad (14)$$

At block 815, a PIM modeling circuit generates updated coefficients (W) for the PIM model. That is, the PIM modeling circuit can use Equation 11 to solve for the coefficients W that are then used to adapt the PIM model (e.g., the PIM model used by the PIM compensation circuit 420 in FIG. 4). That is, the coefficients can be used in the digital signal processing represented in Equation 1 that includes the PIM model nonlinear base function.

At block 820, the PIM modeling circuit generates a PIM compensation signal $\hat{y}_{pim}(n)$ using the updated coefficients W. This signal can then be added (or subtracted) from the RX signal to remove PIM interference before the RX signal is transmitted to the baseband processor for further processing. In this manner, the adapt circuit in the method 800 can remove PIM interference regardless of its relative power to the RX data.

Figure 9A:
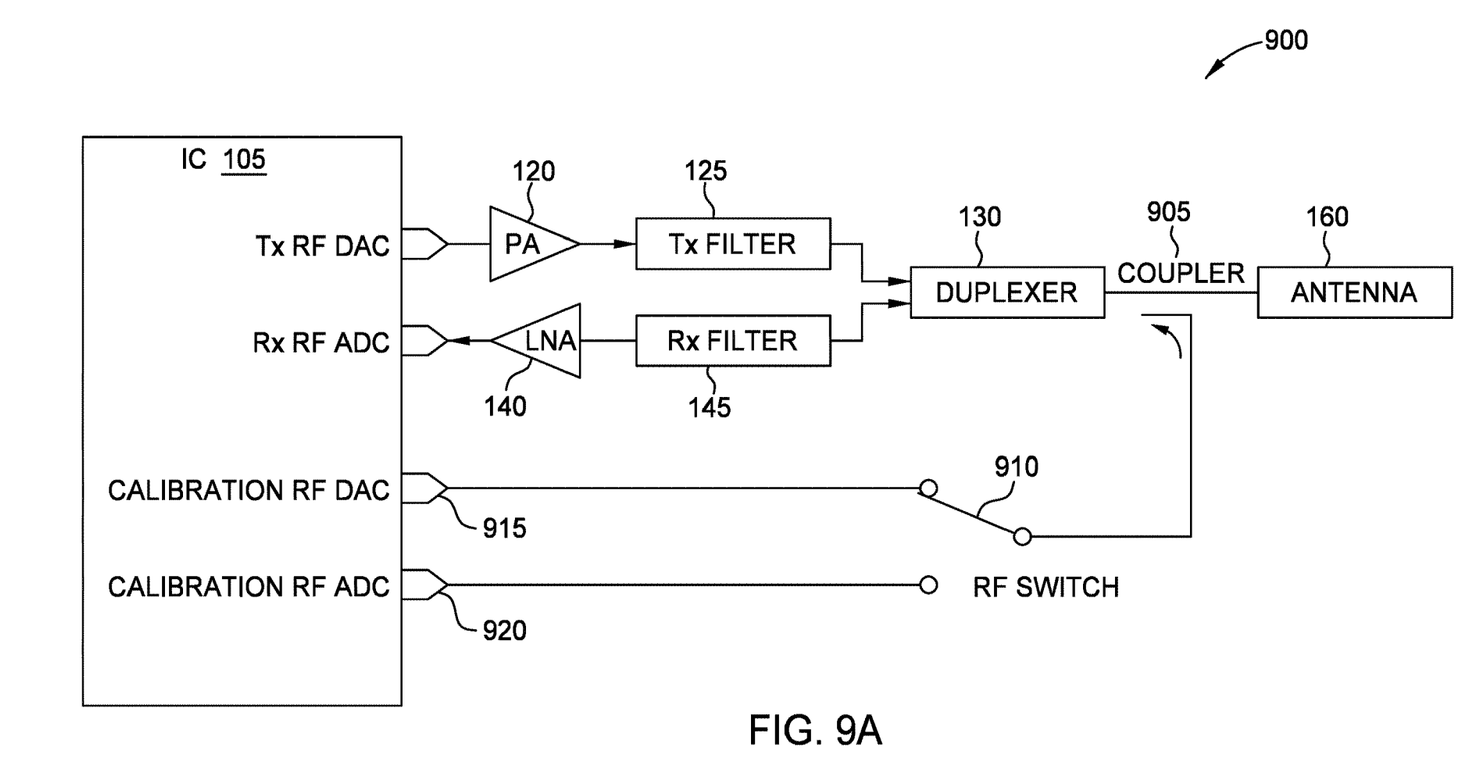
FIGS. 9A and 9B illustrates a base station for training an equalizer and modeling a TX channel, according to an example.

FIG. 9A illustrates a base station 900, according to an example. To model identify the characteristics of the RX channel and to determine the taps of the equalizer 405 in FIG. 4, the calibration RF DAC 915 can transmit calibration signals which are then routed by a switch 910 to a coupler 905 which injects the signals into the duplexer 130. In turn, the duplexer 130 transmits the calibration signals through the RX path until they are received and digitized by the RX RF ADC. The received calibration signal can be compared to the transmitted calibration data to determine the characteristics (e.g., the group delay) of the RX channel. These characteristics can then be used to configure the taps of the equalizer 405 in FIG. 4.

Figure 9B:
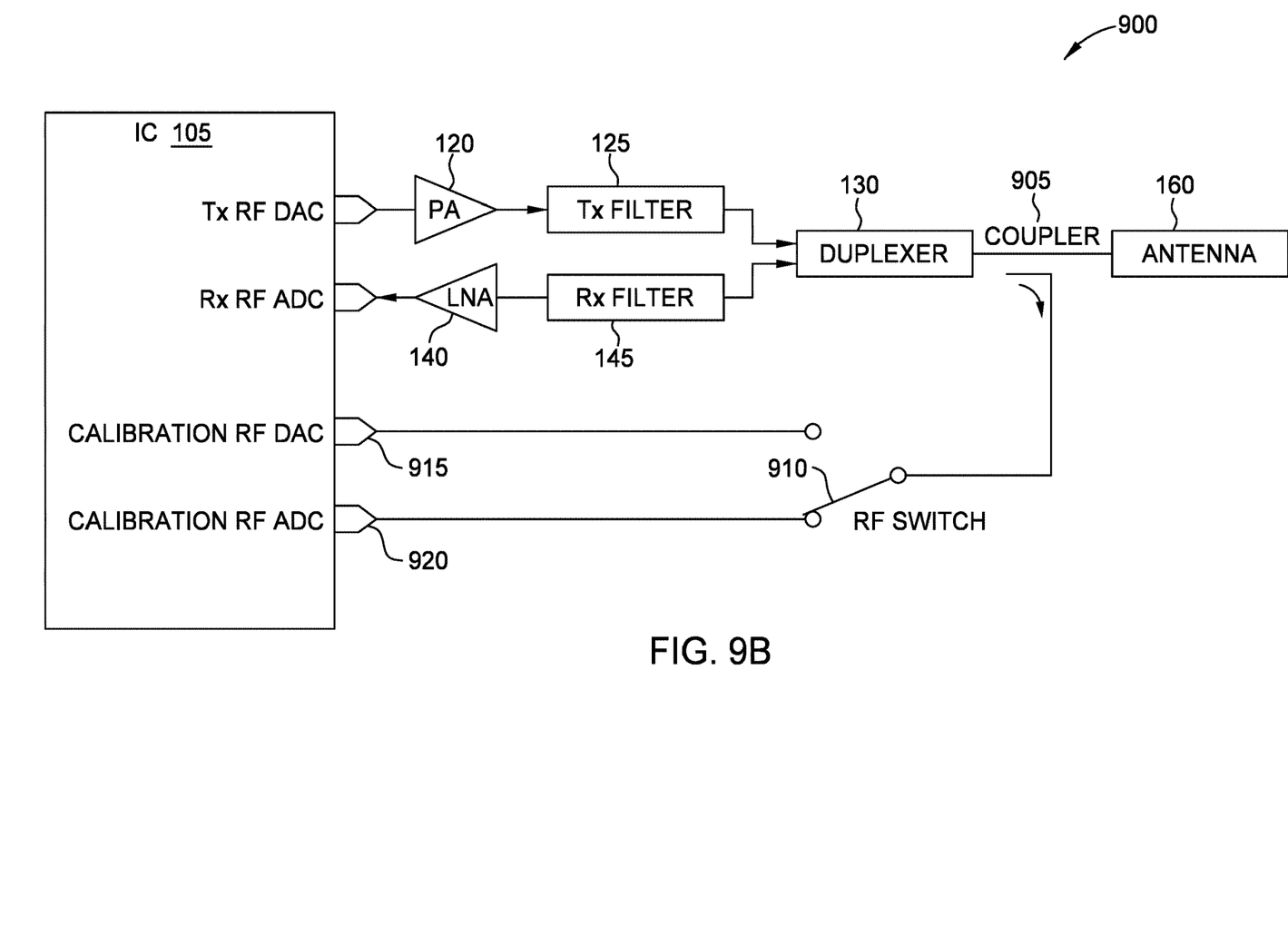

FIG. 9B illustrates using the base station 900 for modeling the TX channel, according to an example. The base station 900 can transmit calibration signals along the TX path from the TX RF ADC to the duplexer 130. The coupler 905 can measure the calibration signals after being output by the duplexer 130. In this example, the coupler 905 is switched relative to FIG. 9A so that the calibration signals are transmitted to a calibration RF ADC 920 which converts the calibration signals into a digital signal. The received digit signal and the transmitted calibration signal can be used to model the TX channel.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the users computer and partly on a remote computer or entirely on the remote computer or server. In the latter scenario, the remote computer may be connected to the users computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. An integrated circuit, comprising:
   an equalizer configured to equalize receive (RX) data received from a RX channel to mitigate or remove RX channel memory effects from the RX data without removing effects of passive intermodulation (PIM) interference or transmit (TX) channel memory effects of TX data;
   a TX modeling circuit configured to receive the TX data and model effects from transmitting the TX data in a TX channel, wherein the RX channel and the TX channel are coupled to a duplexer;
   a PIM compensation circuit configured to receive an output of the TX modeling circuit and generate a PIM compensation value; and
   a mitigation circuit configured to mitigate or remove the PIM interference including the TX channel memory effects from the equalized RX data using the PIM compensation value.

2. The integrated circuit of claim 1, wherein the mitigation circuit comprises a subtraction circuit configured to subtract the PIM compensation value from the equalized RX data.

3. The integrated circuit of claim 1, wherein the RX and TX channels comprise analog circuitry that includes the RX channel and TX channel memory effects due to sharp transition bandwidth from pass band to stop band.

4. The integrated circuit of claim 3, wherein the analog circuitry comprise a TX filter in the TX channel and a RX filter in the RX channel.

5. The integrated circuit of claim 4, wherein the equalizer is configured to compensate for the RX channel memory effects associated with the RX filter and the TX modeling circuit is configured to compensate for the TX channel memory effects of the TX filter.

6. The integrated circuit of claim 1, wherein the duplexer is coupled to an antenna, wherein the antenna is configured to both transmit the TX data and receive the RX data.

7. The integrated circuit of claim 1, further comprising:
   a PIM modeling circuit configured to generate updated coefficient values for the PIM compensation circuit using data where PIM interference has been removed.

8. The integrated circuit of claim 1, wherein the integrated circuit is configured to perform signal processing in a base station.

9. A circuit, comprising:
   an equalizer configured to equalize receive (RX) data received from a RX channel to mitigate or remove RX channel memory effects from the RX data without removing effects of passive intermodulation (PIM) interference or transmit (TX) channel memory effects of TX data;
   a TX modeling circuit configured to receive the TX data before the TX data propagates in a TX channel comprising analog circuitry and model effects from transmitting the TX data in the TX channel;
   a PIM compensation circuit configured to receive an output of the TX modeling circuit and generate a PIM compensation value; and
   a mitigation circuit configured to mitigate or remove the PIM interference including the TX channel memory effects from the equalized RX data using the PIM compensation value.

10. The circuit of claim 9, wherein the mitigation circuit comprises a subtraction circuit configured to subtract the PIM compensation value from the equalized RX data.

11. The circuit of claim 9, wherein the RX and TX channels comprise analog circuitry that includes the RX channel and TX channel memory effects due to sharp transition bandwidth from pass band to stop band.

12. The circuit of claim 11, wherein the analog circuitry comprises a TX filter in the TX channel and a RX filter in the RX channel.

13. The circuit of claim 12, wherein the equalizer is configured to compensate for the RX channel memory effects associated with the RX filter and the TX modeling circuit is configured to compensate for the TX channel memory effects of the TX filter.

14. The circuit of claim 9, wherein the RX channel and the TX channel are coupled to a duplexer and the duplexer is configured to couple to an antenna, wherein the antenna is configured to both transmit the TX data and receive the RX data.

15. The circuit of claim 9, further comprising:
   a PIM modeling circuit configured to generate updated coefficient values for the PIM compensation circuit using data where PIM interference has been removed.

16. A method, comprising:
   equalizing receive (RX) data received from a RX channel to mitigate or remove RX channel memory effects from the RX data without removing effects of passive intermodulation (PIM) interference or transmit (TX) channel memory effects of TX data;
   generating modeled TX data by modeling effects from transmitting the TX data in a TX channel, wherein the RX channel and the TX channel are coupled to a duplexer;

generating a PIM compensation value based on the modeled TX data and PIM model; and mitigating the PIM interference including the TX channel memory effects from the equalized RX data using the PIM compensation value.

17. The method of claim 16, wherein mitigating the PIM interference comprises:

subtracting the PIM compensation value from the equalized RX data.

18. The method of claim 16, wherein equalizing the RX data compensates for RX channel memory effects associated with a RX filter in the RX channel.

19. The method of claim 16, wherein generating the modeled TX data compensates for TX channel memory effects of a TX filter in the RX channel.

20. The method of claim 16, further comprising:

generating updated coefficient values for the PIM model using data where PIM interference has been removed.

* * * * *